United States Patent
Rudolph

(10) Patent No.: US 8,974,121 B1
(45) Date of Patent: Mar. 10, 2015

(54) THRUST PLATE WITH WEAR LAYER

(71) Applicant: Caterpillar Inc., Peoria, IL (US)

(72) Inventor: Paul D. Rudolph, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/053,802

(22) Filed: Oct. 15, 2013

(51) Int. Cl.
| | |
|---|---|
| F16C 17/04 | (2006.01) |
| F16C 35/00 | (2006.01) |
| F16C 33/12 | (2006.01) |
| F16C 9/03 | (2006.01) |

(52) U.S. Cl.
CPC .............. *F16C 33/124* (2013.01); *F16C 9/03* (2013.01)
USPC .......................... 384/420; 384/429; 384/440

(58) Field of Classification Search
USPC ......... 384/121, 288, 294, 420, 424–429, 440; 74/567
See application file for complete search history.

(56) References Cited

U.S. PATENT DOCUMENTS

| | | | |
|---|---|---|---|
| 1,165,655 A | * | 12/1915 | Eldridge ....................... 384/427 |
| 1,498,578 A | * | 6/1924 | Romano ....................... 384/427 |
| 4,525,083 A | | 6/1985 | Pedersen |
| 6,375,357 B2 | | 4/2002 | Miura et al. |
| 6,601,992 B2 | | 8/2003 | Tabuti et al. |
| 7,163,368 B2 | | 1/2007 | Ide et al. |
| 2011/0200281 A1 | | 8/2011 | Uehara et al. |

FOREIGN PATENT DOCUMENTS

GB      971425      9/1964

* cited by examiner

*Primary Examiner* — Thomas R. Hannon
*Assistant Examiner* — Adam D Rogers
(74) *Attorney, Agent, or Firm* — Bart A. Fisher

(57) ABSTRACT

A thrust plate is provided. The thrust plate includes a first side surface and a second side surface. The thrust plate also includes an inner surface and an outer surface extending axially between the first and second side surfaces respectively. Further, the inner and outer surfaces of the thrust plate define an inner diameter and outer diameter respectively. The thrust plate further includes a number of mounting apertures extending between the first and second side surfaces. The number of mounting apertures is defined proximate to the outer diameter of the thrust plate. A wear layer is positioned radially inward from the mounting apertures. The wear layer is integrated into a stepped portion defining a wear prone area on the first and/or second side surfaces. Further, the wear layer is made of a material different from that of a core of the thrust plate.

20 Claims, 8 Drawing Sheets

THRUST PLATE WITH WEAR LAYER

TECHNICAL FIELD

The present disclosure relates to a thrust plate, and more particularly to the thrust plate provided with a wear layer.

BACKGROUND

A thrust plate is associated with a crankshaft and/or camshaft of an engine to restrict the movement of the crankshaft/camshaft. The thrust plate may be disposed about the crankshaft/camshaft such that, a surface of the crankshaft/camshaft mates with at least a portion of the thrust plate. The crankshaft/camshaft of the engine may be made of a material such as steel. The thrust plate is sometimes also made of the same or similar ferrous material as that of the crankshaft/camshaft. The mating of these two surfaces, that is the thrust plate and the crankshaft/camshaft, which are made of the same material may lead to high wear rates on the given surfaces.

Known solutions include the use of a material, such as, for example, bronze, or aluminum bronze that is different from the material of the crankshaft/camshaft. A bronze thrust plate may exhibit good wear resistance properties. However, such materials may not provide the required strength and stiffness to the thrust plate. Also, the use of such materials for forming the thrust plate may pose cost consideration issues.

U.S. Pat. No. 6,601,992 discloses an annular thrust bearing composed of an annular backing plate made of steel and an annular bearing layer joined to one side of the backing plate during a sintering operation. The bearing layer is made of an alloy composed of copper, tin and silver. The bearing layer is roll-formed in a spiral fashion after the sintering operation.

SUMMARY OF THE DISCLOSURE

In one aspect of the present disclosure, a thrust plate is provided. The thrust plate includes a first side surface and a second side surface. The first and second side surfaces are spaced apart from one another and define a thickness of the thrust plate therebetween. The thrust plate also includes an inner surface and an outer surface extending axially between the first and second side surfaces respectively. Further, the inner and outer surfaces of the thrust plate define an inner diameter and outer diameter respectively. The thrust plate further includes a number of mounting apertures extending between the first and second side surfaces. The number of mounting apertures is defined proximate to the outer diameter of the thrust plate. A wear layer is positioned radially inward from the mounting apertures. The wear layer is integrated into a stepped portion defining a wear prone area on the first and/or second side surfaces. Further, the wear layer is made of a material different from that of a core of the thrust plate.

In another aspect of the present disclosure, a thrust plate is provided. The thrust plate includes a first side surface and a second side surface. The first and second side surfaces are spaced apart from one another and define a thickness of the thrust plate therebetween. The thrust plate also includes an inner surface and an outer surface extending axially between the first and second side surfaces respectively. Further, the inner and outer surfaces of the thrust plate define an inner diameter and outer diameter respectively. The thrust plate further includes a number of mounting apertures extending between the first and second side surfaces. The numbers of mounting apertures are defined proximate to the outer diameter of the thrust plate. A wear layer is positioned radially inward from the mounting apertures. The wear layer is integrated into a stepped portion defining a wear prone area on the first and/or second side surfaces. Further, the wear layer is made of a material different from that of a core of the thrust plate. Additionally, a locking mechanism is provided within the stepped portion of the thrust plate. The locking mechanism includes a plurality of holes in a spaced apart arrangement for receiving a portion of the wear layer therethrough to positively lock the wear layer with the thrust plate.

In yet another aspect of the present disclosure, a thrust plate is provided. The thrust plate includes a first side surface and a second side surface. The first and second side surfaces are spaced apart from one another and define a thickness of the thrust plate therebetween. The thrust plate also includes an inner surface and an outer surface extending axially between the first and second side surfaces respectively. Further, the inner and outer surfaces of the thrust plate define an inner diameter and outer diameter respectively. The thrust plate further includes a number of mounting apertures extending between the first and second side surfaces. The numbers of mounting apertures are defined proximate to the outer diameter of the thrust plate. A wear layer is positioned radially inward from the mounting apertures. The wear layer is mechanically fastened into a stepped portion defining a wear prone area on the first and second side surfaces respectively. The wear layer is made of a material different from that of a core of the thrust plate.

Other features and aspects of this disclosure will be apparent from the following description and the accompanying drawings.

DETAILED DESCRIPTION

Figure 1:
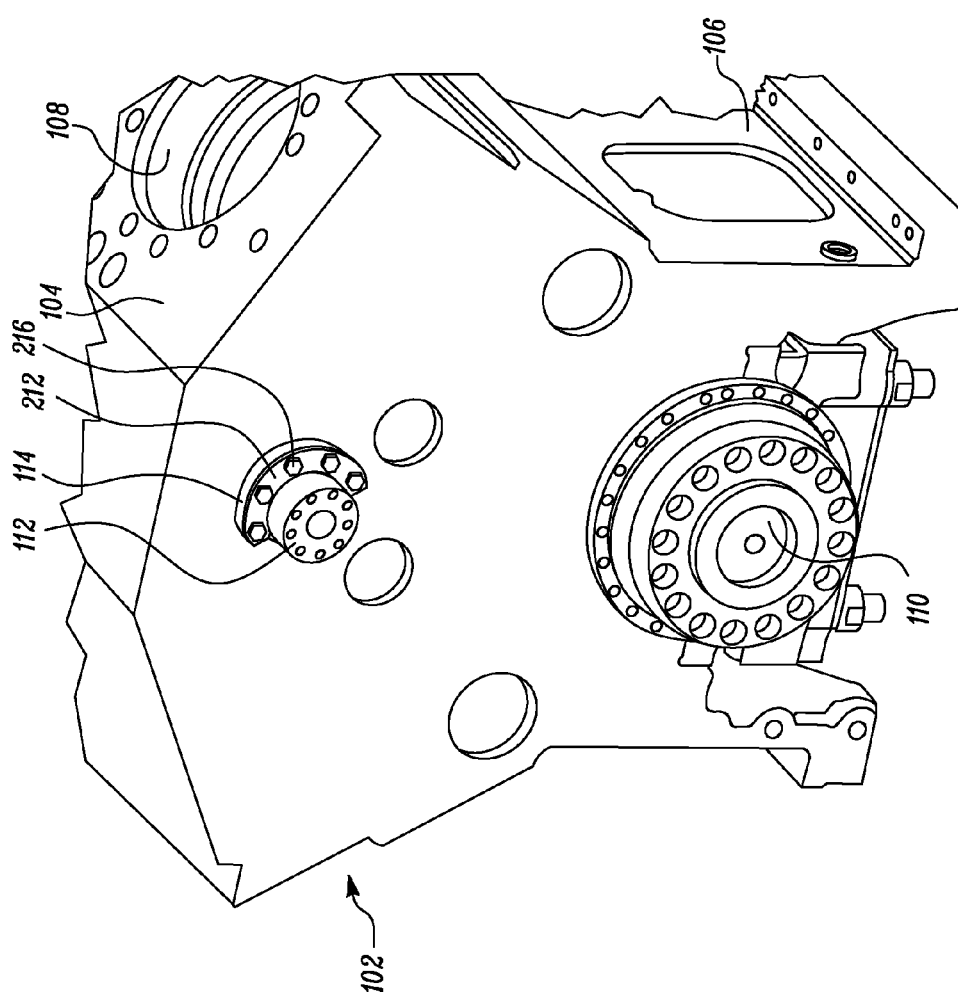
FIG. 1 is a perspective view of a portion of an exemplary engine block, according to an embodiment of the present disclosure.

Wherever possible, the same reference numbers will be used throughout the drawings to refer to the same or the like parts. FIG. 1 is an exemplary housing 102 of an engine. More specifically, the engine is a multi cylinder internal combustion engine. The engine may also be an external combustion engine or an air-breathing combustion engine. The engine may be powered by any one or a combination of known liquid or gaseous fuels including, but not limited to, gasoline, diesel, natural gas, petroleum gas and bio-fuels.

The engine housing 102 may include a cylinder head 104 and an engine block 106. The engine block 106 may include a plurality of cylinders 108. Each of the plurality of cylinders 108 is configured to house a piston (not shown). The piston may have a translatory movement within the cylinder 108. The piston may be coupled to a crankshaft 110 by a connecting rod (not shown). The connecting rod may be configured to convert the translatory movement of the piston to a rotary movement of the crankshaft 110. Further, a camshaft 112 may be associated with the engine primarily to operate valves of the cylinders 108 during a combustion process. A thrust plate 114 may be positioned around the camshaft 112. In one embodiment, the positioning of the thrust plate 114 is such that the thrust plate 114 may lie partially in contact with the camshaft 112 and also partially in contact with the engine housing 102. The thrust plate 114 is configured to restrict a movement of the camshaft 112 in an axial direction with respect to the engine housing 102. In one embodiment, the thrust plate 114 may also be provided on the crankshaft 110 of the engine.

Figure 2:
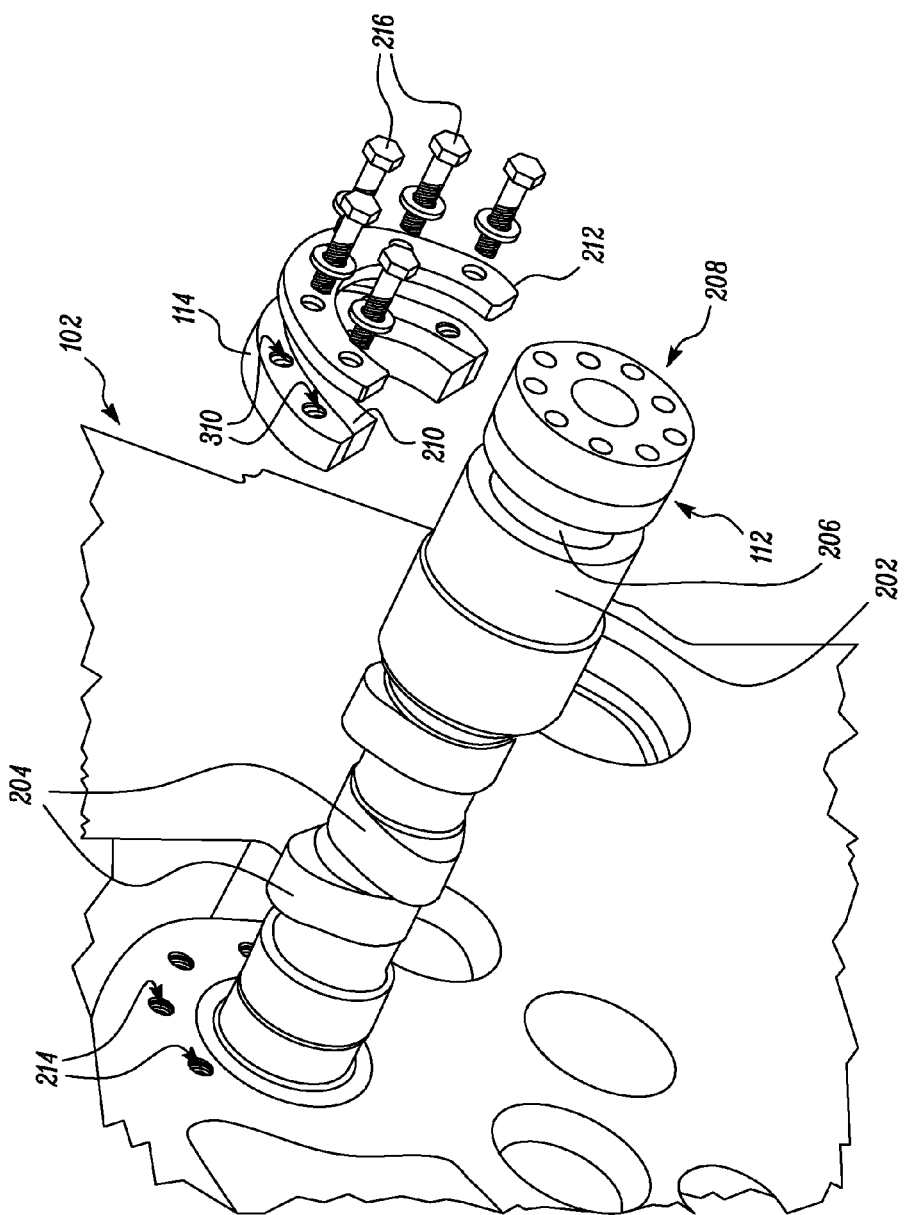
FIG. 2 is an exploded view of a camshaft and a thrust plate associated with the engine block of FIG. 1.

Referring to FIG. 2, an exploded view of the camshaft 112 and the thrust plate 114 is illustrated. The camshaft 112 includes a cylindrical rod 202. The camshaft 112 may be received into engine housing 102 such that the camshaft 112 may run through a length of a bank of the cylinders 108. The camshaft 112 may further include a plurality of cams 204 or lobes arranged on the camshaft 112 at intervals. As shown, the thrust plate 114 may be inserted into a step 206 provided proximate to and at least partially surrounding a head portion 208 of the camshaft 112. When assembled, the head portion 208 of the camshaft 112 may extend outside of the engine housing 102. The thrust plate 114 includes a wear layer 210 integrated thereon. The different configurations of the thrust plate 114 and the wear layer 210 will now be explained in detail with connection to FIGS. 3 to 8, according to various embodiments of the present disclosure.

Figure 3:
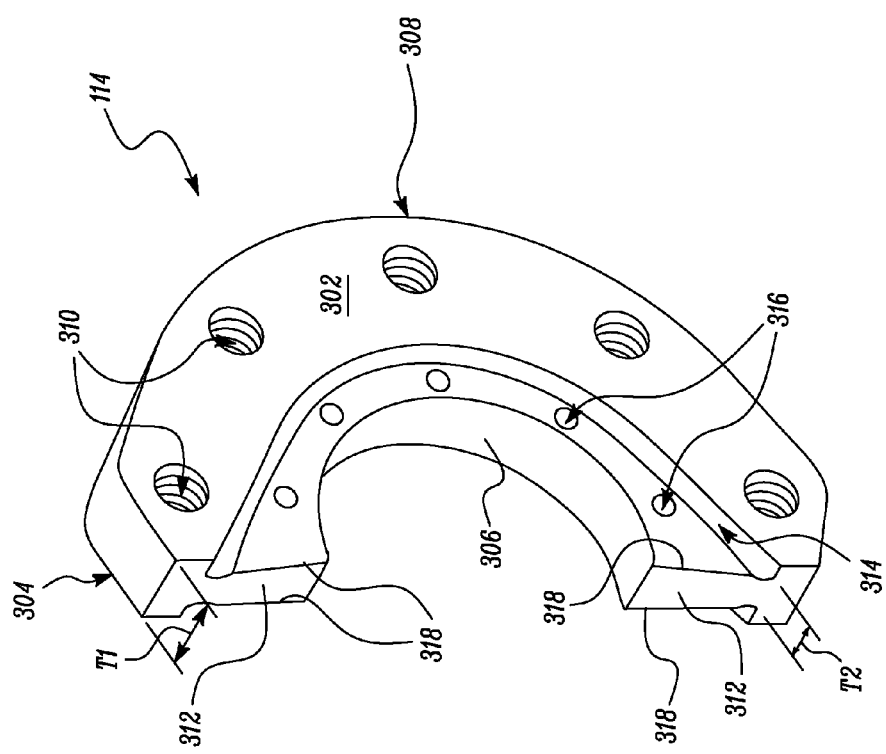
FIG. 3 is a perspective view of the thrust plate without a wear layer.

FIG. 3 illustrates a perspective view of the thrust plate 114 before the wear layer 210 is integrated thereon. The thrust plate 114 includes a first side surface 302 and a second side surface 304. The first and second side surfaces 302, 304 are spaced apart from each other, such that the first and second side surfaces 302, 304 are disposed opposite to one another. A thickness T1 of the thrust plate 114 is defined between the first and second side surfaces 302, 304. The thrust plate 114 may be substantially symmetrical between the first and second side surfaces 302, 304. The thrust plate 114 also includes an inner surface and an outer surface 306, 308 extending axially from the first and second side surfaces 302, 304 respectively. Further, the inner and outer surfaces 306, 308 of the thrust plate 114 define an inner diameter and an outer diameter of the thrust plate 114 respectively.

The thrust plate 114 further includes a number of mounting apertures 310, such that the mounting apertures 310 extend between the first and second side surfaces 302, 304. The mounting apertures 310 are provided proximate to the outer diameter of the thrust plate 114. The thrust plate 114 further includes a stepped portion 312 provided on at least one of the first and second side surfaces 302, 304. The stepped portion 312 has a thickness T2 which is less compared to the thickness T1 along the outer surface 308 of the thrust plate 114. The wear layer 210 (see FIG. 2) is integrated into the stepped portion 312 of the thrust plate 114 using different methods.

Referring to FIG. 2, the thrust plate 114 may be positioned within the step 206 provided at the head portion 208 of the camshaft 112. It should be noted that the inner diameter of the thrust plate 114 may be substantially equal or greater than a diameter of the step 206 so that the thrust plate 114 may be fitted into the step 206. In one embodiment, when assembled, there may be a clearance between the thrust plate 114 and the camshaft 112. The thrust plate 114 may be shaped to cooperate with the step 206 of the camshaft 112 allowing the thrust plate 114 to be fitted within the step 206.

Additionally, in one embodiment, a backing plate 212 may be provided on the first or second side surfaces 302, 304 of the thrust plate 114. The backing plate 212 is provided with a number of holes corresponding to the mounting apertures 310 of the thrust plate 114. A set of holes 214 may also be provided on the engine housing 102 in alignment with the mounting apertures 310 and the holes on the backing plate 212. Mechanical fasteners 216 may be received through holes of the backing plate 212, the mounting apertures 310 of the thrust plate 114 and the holes 214 provided on the engine housing 102, for attaching the backing plate 212 and the thrust plate 114 to the engine housing 102. The mechanical fasteners 216 may include any one of a bolt, set screw, rivet and the like. It should be noted that the thrust plate 114 may have various designs and is not limited to that disclosed herein.

The thrust plate 114 may have a single or multi-piece design. In the illustrated embodiment, a single substantially semicircular thrust plate 114 is shown. A combination of two such thrust plates 114 may be utilized to surround the camshaft 112. Alternatively, a single circular shaped thrust plate 112 may be used. Further, size, thickness, shape and other dimensions of the thrust plate 114 may vary based on system requirements.

Figure 4:
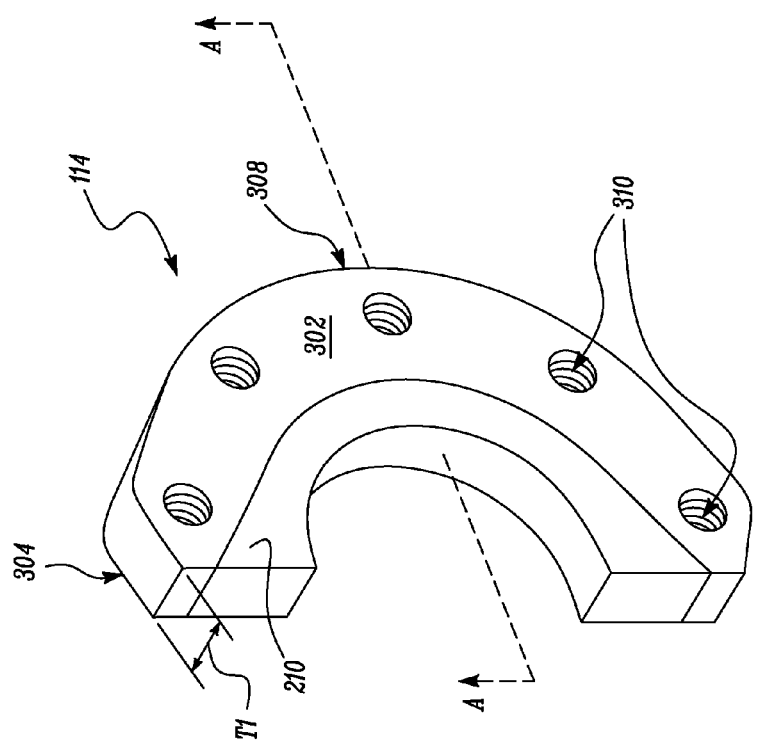
FIG. 4 is a perspective view of the thrust plate of FIG. 3 including the wear layer positively locked onto the thrust plate, and having a cutting plane A-A.

FIG. 4 is a perspective view of the thrust plate 114 including a cutting plane A-A. Referring to FIG. 4, the wear layer 210 may be integrated on the first side surface 302. In one embodiment, the wear layer 210 may also be integrated on the second side surface 304 of the thrust plate 114. The wear layer 210 may be positioned radially inwards from the mounting apertures 310. More particularly, the wear layer 210 is integrated into the stepped portion 312 (see FIG. 3) on the first and/or second side surfaces 302, 304. The stepped portion 312 of the thrust plate 114 defines a wear prone surface thereon.

The thrust plate 114 may be made of a material utilized to make any known thrust surface in the art, for example, steel, cast iron, aluminum, ductile iron, and titanium. This material may impart strength and stiffness by forming a core of the thrust plate 114. The wear layer 210 integrated into the thrust plate 114 may be made of a material that is different from that of the core of the thrust plate 114.

In one embodiment, the wear layer 210 may be made of bronze or an alloy of bronze, such as, for example aluminum bronze. Also, materials such as brass, copper, tin, lead, or aluminum alloys may also be used for the wear layer 210. This material may impart wear resistance to the wear prone area defined on the thrust plate 114 which may come in contact with the rotatable camshaft 112 and hence be subject to frictional forces. It should be noted that a thickness of the wear layer 210 may be based on an overall size, shape and thickness T1 of the thrust plate 114. Also, after integration of the wear layer 210, the thrust plate 114 may have a substantially planar surface 302, 304. In one embodiment, the thickness of the wear layer 210 may approximately lie in a range between. 0.5 mm to 10 mm.

Figure 5:
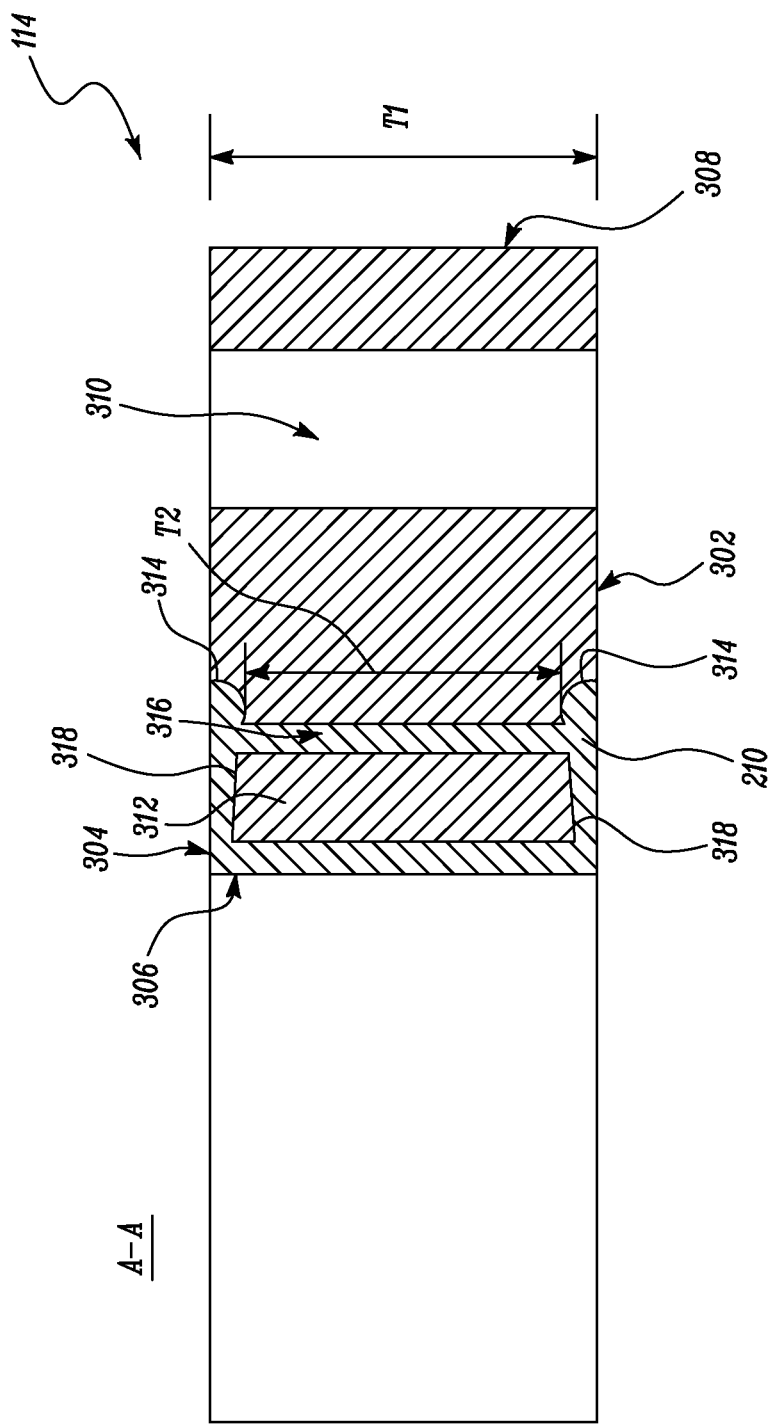
FIG. 5 is a cut-section of the thrust plate of FIG. 4 along the cutting plane A-A.
Figure 6:
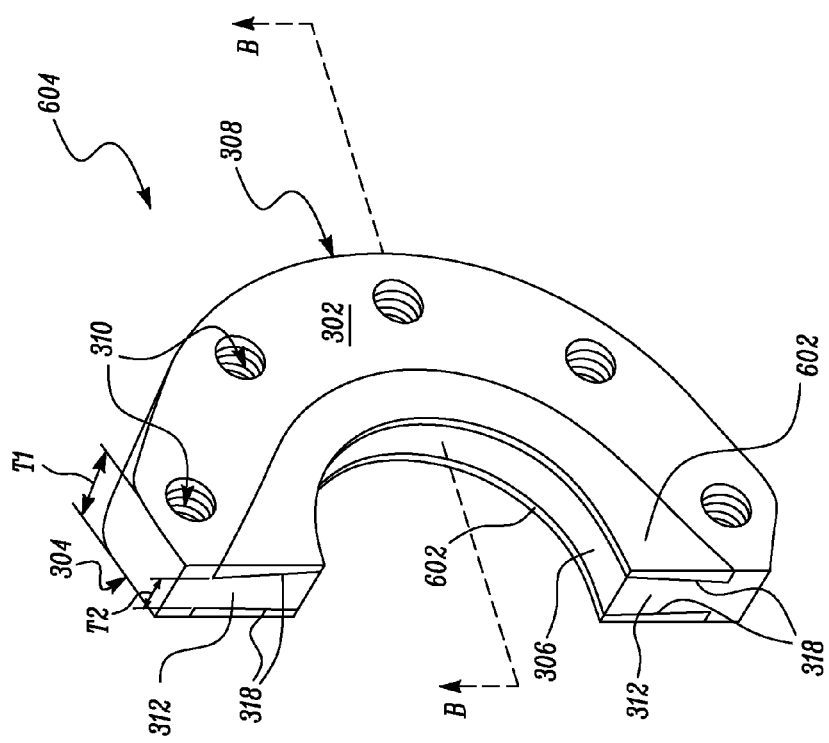
FIG. 6 is another configuration of the thrust plate including the wear layer sprayed onto the thrust plate and having a cutting plane B-B, according to various embodiments of the present disclosure.
Figure 7:
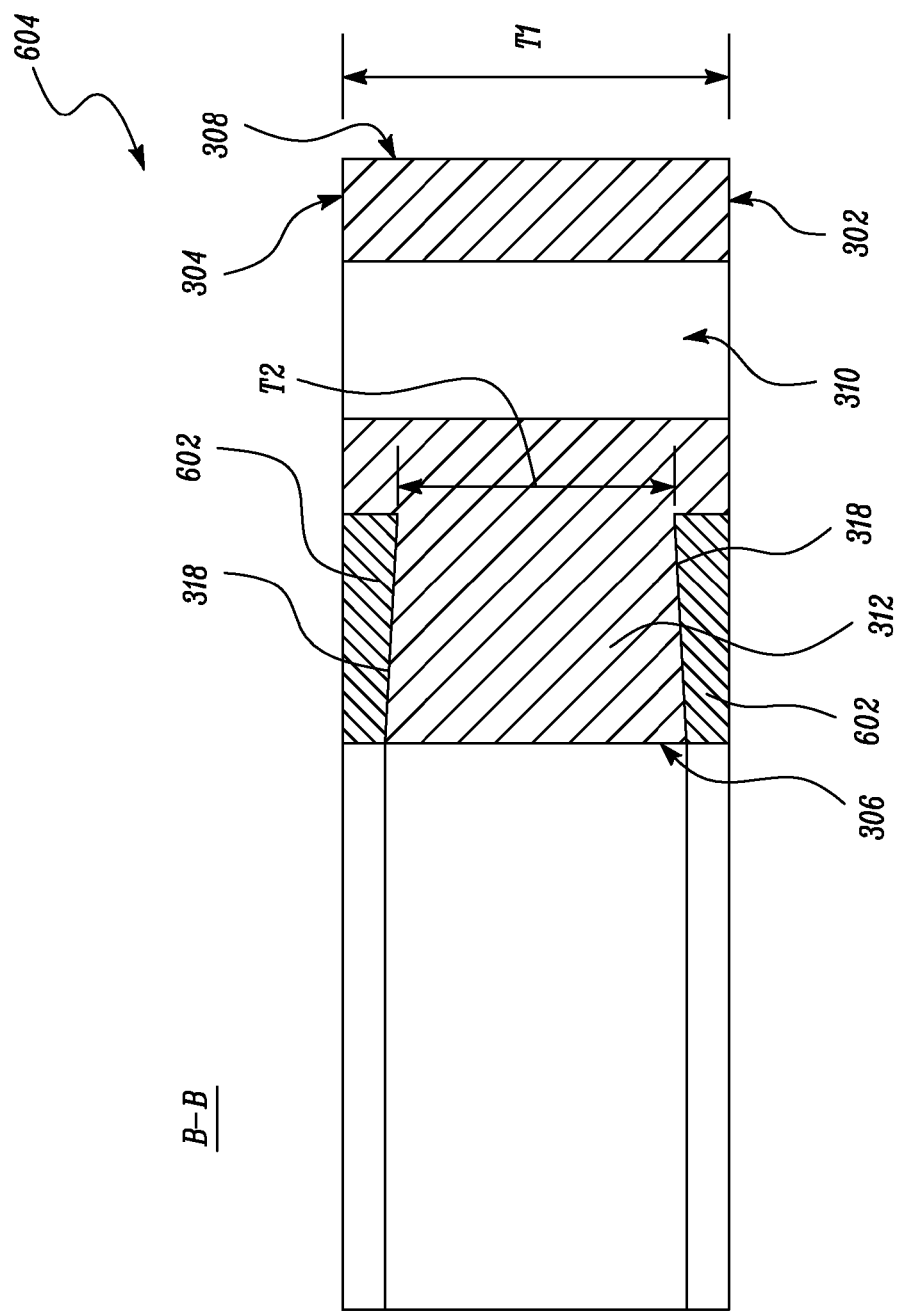
FIG. 7 is a cut-section view of the thrust plate of FIG. 6 along the cutting plane B-B.
Figure 8:
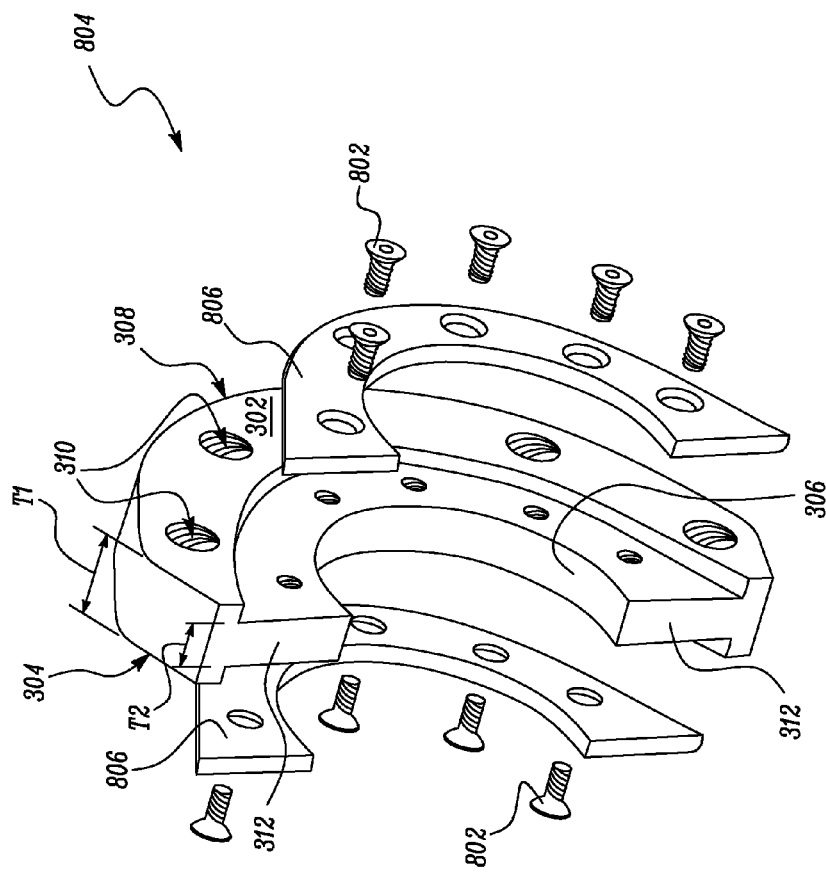
FIG. 8 is an exploded view of yet another configuration of the thrust plate including the wear layer mechanically fastened onto the thrust plate.

Different ways of attaching the wear layer 210 into the step 206 provided on the thrust plate 114 will now be explained, according to various embodiments of the present disclosure. FIGS. 3, 4, 5 utilize casting for integrating the wear layer 210 with the thrust plate 114. In FIGS. 6 and 7, metal spraying is used to integrate the wear layer 602 with the thrust plate 604. FIG. 8 illustrates the use of mechanical fasteners 802 to integrate the wear layer 806 with the thrust plate 804. After integration of the wear layer 210, 602, 806 with the thrust plate 114, 604, 804 the first and second side surfaces 302, 304 of the thrust plate 114, 604, 804 and/or the wear layer 210, 602, 806 may be machined for precision sizing and also to remove any excessive material projecting from the first and/or second side surfaces 302, 304 of the thrust plate 114, 604, 804.

Referring to FIGS. 3, 4, 5, any known casting process may be used to integrate the wear layer 210 into the stepped portion 312 of the thrust plate 114. The casting process may be sand casting, permanent mold casting, die casting and the like. In the illustrated embodiment, as seen in FIG. 4, the wear layer 210 of the thrust plate 114 extends from the stepped portion 312 on the first side surface 302 along the inner surface 306 and further into the stepped portion 312 on the second side surface 304.

The thrust plate 114 may be provided with a locking mechanism within the stepped portion 312 to positively lock the wear layer 210 into the thrust plate 114. In one embodiment, the locking mechanism may include a groove 314 provided along a periphery of the stepped portion 312 of the thrust plate 114. Additionally, the locking mechanism may include a plurality of holes 316 provided on the thrust plate 114. These holes 316 may be circumferentially spaced apart from one another within the stepped portion 312. FIG. 5 illustrates a cross sectional view of the thrust plate 114 along the cutting plane A-A shown in FIG. 4. During casting, the material used to form the wear layer 210 may flow into the groove 314 and through the holes 316 provided on the thrust plate 114. The groove 314 and the holes 316 provide a positive locking between the wear layer 210 and the thrust plate 114. Further, in one embodiment, a taper 318 may be provided on the stepped portion 312, such that the thickness T2 of the stepped portion 312 may gradually increase towards the inner surface 306 of the thrust plate 114. As shown in FIGS. 4 and 5, the wear layer 210 may extend along the inner surface 306 of the thrust plate 114.

FIG. 6 is a perspective view wherein the metal spraying technique used to integrate the wear layer 602 with the thrust plate 604. FIG. 6 includes a cutting plane B-B. The metal spraying technique may include, but not limited to, detonation spraying, wire arc spraying, plasma spraying, flame spraying, high velocity oxy-fuel coating spraying (HVOF), warm spraying, cold spraying, and any combination thereof. In the given embodiment, the wear layer 602 is sprayed onto the first and second side surfaces 302, 304. FIG. 7 is a cross sectional view of the thrust plate 604 along the cutting plane B-B shown in FIG. 6. The sprayed wear layer 602 may be received into the taper 318 provided on the stepped portion 312 of the first and second side surfaces 302, 304 of the thrust plate 604.

FIG. 8 is an exploded view showing the use of mechanical fasteners 802 for attaching the wear layer to the thrust plate 804. In this embodiment, the wear layer may be formed by a wear plate 806 made of the wear resistant material. The wear plate 806 may be manufactured using any metal forming process known in the art. For example, as shown, two wear plates 806 are provided on the first and second side surfaces 302, 304 of the thrust plate 804 respectively.

It should be noted that the stepped portion 312 of the thrust plate 804 may have a uniform thickness for receiving the wear plate 806 therein. The mechanical fasteners 802 may be received into the wear plate 806 and the thrust plate 804 for attaching the wear plate 806 to the thrust plate 804. Moreover, the mechanical fasteners 802 may be received into the wear plate 806 in such a manner that the mechanical fasteners 802 will lie within a surface of the wear plate 806 in order to prevent any interference when the thrust plate 804 is installed.

INDUSTRIAL APPLICABILITY

The present disclosure relates to the thrust plate 114, 604, 804 with the wear layer 210, 602, 806 integrated thereon. The wear layer 210, 602, 806 may be made of the material exhibiting wear resistive properties, while the core of the thrust plate 114, 604, 804 is made of the material which may provide strength and stiffness to the thrust plate 114, 604, 804. As described above, the wear layer 210, 602, 806 may be integrated with the thrust plate 114, 604, 804 using a variety of methods, such as, but not limited to, casting, metal spraying, and mechanical fastening processes. The thrust plate 114, 604, 804 of the present disclosure may provide a cost effective solution having relatively high strength, stiffness and thrust wear properties. The given thrust plate 114, 604, 804 may be easy to manufacture and assemble, and additionally have a long life. Also, a relatively smaller thickness package space provided by the integrated wear layers 210, 602, 806 may result in a space saving design.

The thrust plate 114, 604, 804 may be used in connection with any engine or engine component and is not limited to the application disclosed herein. Moreover, the thrust plate 114, 604, 804 may be used in any industrial application requiring a compact thrust plate 114, 604, 804 exhibiting high strength and improved wear properties.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A thrust plate comprising:
   a first side surface and a second side surface spaced apart from one another along an axial direction and defining a first thickness of the thrust plate therebetween;
   an inner surface and an outer surface each extending in the axial direction between the first and second side surfaces, the outer surface spaced from the inner surface in a radial direction;
   a number of mounting apertures extending in the axial direction between the first and second side surfaces, at least one of the mounting apertures positioned closer to the outer surface than the inner surface with respect to the radial direction;
   a stepped portion that defines a second thickness measured along the axial direction, such that the second thickness is less than the first thickness as measured along the axial direction;
   a wear layer positioned closer to the inner surface with respect to the radial direction than the at least one of the mounting apertures is positioned from the inner surface with respect to the radial direction, the wear layer integrated into the stepped portion, wherein the wear layer is made of a material different from that of the stepped portion; and
   a locking mechanism configured to lock the wear layer to the stepped portion, the locking mechanism including a plurality of holes in a spaced apart arrangement within the stepped portion.

2. The thrust plate of claim 1, wherein the stepped portion is tapered.

3. The thrust plate of claim 1, wherein the locking mechanism includes a groove provided at least partially along a periphery of the stepped portion.

4. The thrust plate of claim 1, wherein the wear layer extends from the stepped portion on the first side surface along the inner surface and to the stepped portion on the second side surface.

5. The thrust plate of claim 1, wherein the wear layer is integrated with the stepped portion by casting.

6. The thrust plate of claim 1, wherein the wear layer is integrated with the stepped portion by metal spraying.

7. The thrust plate of claim 1, wherein the wear layer is integrated with the stepped portion using mechanical fasteners.

8. The thrust plate of claim 1, wherein the thrust plate is substantially symmetrical between the first side surface and the second side surface.

9. The thrust plate of claim 1, wherein the thrust plate includes one or more of the following materials: iron, aluminum, steel and titanium.

10. The thrust plate of claim 1, wherein the wear layer includes one or more of the following materials: bronze, brass, copper, tin, aluminum alloys, and lead.

11. A thrust plate comprising:
a first side surface and a second side surface spaced apart from one another and defining a first thickness of the thrust plate therebetween;
an inner surface and an outer surface extending axially between the first and second side surfaces, the outer surface spaced from the inner surface in a radial direction;
a number of mounting apertures extending between the first and second side surfaces, each of the mounting apertures positioned closer to the outer surface than the inner surface with respect to the radial direction; and
a wear layer positioned closer to the inner surface than each of the mounting apertures is positioned from the inner surface with respect to the radial direction, the wear layer mechanically fastened to a stepped portion of the thrust plate, wherein the wear layer is made of a material different from that of the stepped portion of the thrust plate.

12. The thrust plate of claim 11, wherein the thrust plate is substantially symmetrical between the first side surface and the second side surface.

13. The thrust plate of claim 11, wherein the wear layer includes one or more of the following materials: bronze, brass, copper, tin, aluminum alloys, and lead.

14. A thrust plate comprising:
a first side surface and a second side surface spaced apart from one another along an axial direction and defining a first thickness of the thrust plate therebetween;
an inner surface and an outer surface each extending in the axial direction between the first and second side surfaces, the outer surface spaced from the inner surface in a radial direction;
a number of mounting apertures extending in the axial direction between the first and second side surfaces, at least one of the mounting apertures positioned closer to the outer surface than the inner surface of the thrust plate with respect to the radial direction;
a stepped portion that defines a second thickness measured along the axial direction, such that the second thickness is less than the first thickness as measured along the axial direction; and
a wear layer positioned closer to the inner surface with respect to the radial direction than the at least one of the mounting apertures is positioned from the inner surface with respect to the radial direction, the wear layer integrated into the stepped portion, wherein the wear layer is made of a material different from that of the stepped portion;
wherein the thrust plate is substantially symmetrical about a plane that is normal to the axial direction.

15. The thrust plate of claim 14, wherein the stepped portion is tapered.

16. The thrust plate of claim 14 further comprising a locking mechanism positioned within the stepped portion, the locking mechanism configured to positively lock the wear layer with the stepped portion.

17. The thrust plate of claim 16, wherein the locking mechanism includes a groove provided at least partially along a periphery of the stepped portion.

18. The thrust plate of claim 14, wherein the wear layer is integrated with the stepped portion by casting.

19. The thrust plate of claim 14, wherein the wear layer is integrated with the stepped portion by metal spraying.

20. The thrust plate of claim 14, wherein the wear layer is integrated with the stepped portion using mechanical fasteners.

* * * * *